United States Patent [19]

Bell

[11] Patent Number: 5,234,084

[45] Date of Patent: Aug. 10, 1993

[54] SHOCK ABSORBER

[75] Inventor: Stephen H. Bell, Guelph, Canada

[73] Assignee: Gabriel Ride Control Products, Inc., Carol Stream, Ill.

[21] Appl. No.: 933,397

[22] Filed: Aug. 20, 1992

Related U.S. Application Data

[63] Continuation-in-part of Ser. No. 922,806, Jul. 31, 1992, abandoned.

[51] Int. Cl.⁵ .............................. F16F 9/52; F16F 5/00
[52] U.S. Cl. ...................................... 188/276; 188/315
[58] Field of Search ............... 188/275, 276, 277, 280, 188/285, 287, 315, 320, 322.15

[56] References Cited

U.S. PATENT DOCUMENTS

| | | | |
|---|---|---|---|
| 2,783,859 | 3/1957 | Patriquin | 188/287 |
| 2,788,092 | 4/1957 | Whisler, Jr. | 188/320 |
| 2,950,785 | 8/1960 | Patriquin | 188/315 |
| 3,127,958 | 4/1964 | Szostak | 188/275 |
| 3,973,654 | 8/1976 | Patriquin | 188/320 |
| 4,133,415 | 1/1979 | Dressell, Jr. et al. | 188/285 |
| 4,284,177 | 8/1981 | Domek | 188/280 |
| 4,356,898 | 11/1982 | Guzder et al. | 188/315 |
| 4,423,800 | 1/1984 | Kobiske et al. | 188/277 |
| 4,775,038 | 10/1988 | Unnikrishnan et al. | 188/320 |

Primary Examiner—Robert J. Oberleitner
Assistant Examiner—Chris Schwartz
Attorney, Agent, or Firm—McAndrews, Held & Malloy, Ltd.

[57] ABSTRACT

An improved piston compression valve mechanism for a shock absorber includes a seal carrier member carried by the shock absorber piston and having a radially extending flange portion and a downwardly extending cylindrical portion, an o-ring seal mounted between upper and lower radially extending arms on the flange portion, and a coil spring mounted on the piston above the seal carrier member. The lower arm of the flange portion has an inner downwardly facing surface adapted to engage an upwardly facing valve seat on the piston, and the upper arm of the flange portion has an upwardly facing surface in force transmitting contact with the lower end of the coil spring. The cylindrical portion of the seal carrier member is provided with a plurality of flow openings spaced about its circumference and along its axial length which are normally in a closed position against the piston. During a compressive movement of the shock absorber, fluid in the compression chamber of the shock absorber increases its pressure on the outer downwardly facing surface of the flange portion, causing the seal carrier member to slide upwardly on the piston initially without spring resistance and then against increasing spring resistance, thereby gradually exposing the flow openings so as to permit fluid to move from the compression chamber to the rebound chamber in the shock absorber. The improved compression valve mechanism is dependent on fluid pressure, rather than fluid viscosity, resulting in a valve mechanism that reduces shock absorber fade at high fluid temperatures.

5 Claims, 1 Drawing Sheet

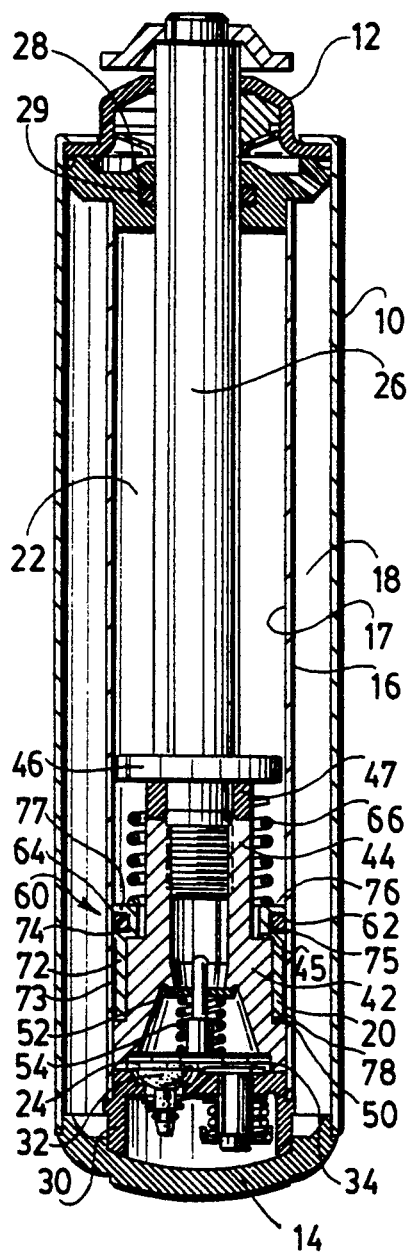
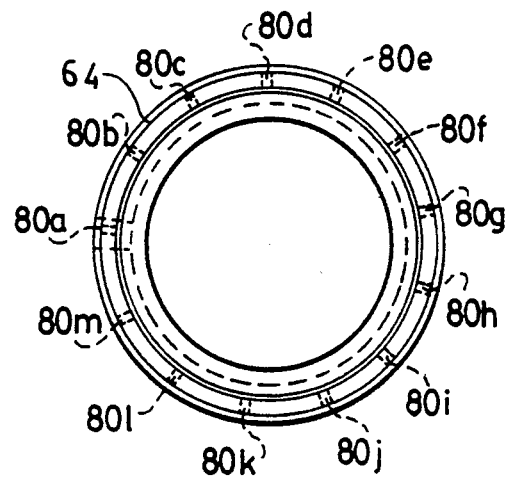
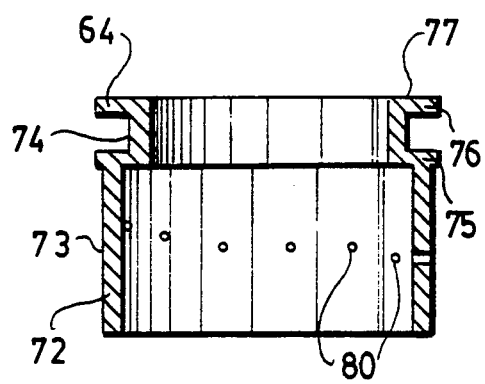
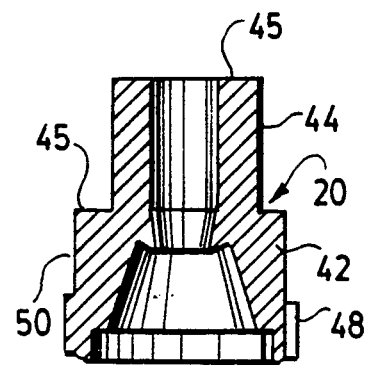

SHOCK ABSORBER

RELATED APPLICATIONS

This is a continuation-in-part of U.S. application filed Jul. 31, 1992 and given the Ser. No. 7/922,806, now abandoned.

BACKGROUND OF THE INVENTION

The present invention relates to hydraulic shock absorbers of the direct double acting tubular type, and in particular, to a shock absorber of this type having an improved piston compression valve assembly. The shock absorber of the present invention is especially useful on vehicles such as snowmobiles.

Direct double acting tubular shock absorbers utilized on vehicles usually comprise a cylinder attached to the axle of the vehicle and a piston in the cylinder which is connected with the frame so that when the vehicle passes over an uneven surface the piston and cylinder move relative to one another. The cylinder contains a suitable damping fluid which is transferred across the piston, and simultaneously a smaller amount, equivalent to the piston rod volumetric displacement, is expelled from one end of the cylinder into a reservoir when the axle and frame move toward one another, relatively. This action is referred to as the compression stroke of the shock absorber. In many instances the valving within the shock absorber is designed to restrict the flow of fluid across the piston and the fluid flow from piston rod volumetric displacement from the cylinder during the compression stroke and thus restrain the motion of the vehicle.

One design for controlling the flow of fluid across the piston during the compression stroke involves mounting an elastomeric o-ring piston seal on the piston body so that the exterior periphery of the o-ring engages the interior periphery of the cylinder to prevent fluid flow along the interior periphery of the cylinder. The upper surface of the o-ring engages a radially extending flange of a seal carrier member of L-shaped cross-sectional configuration. The seal carrier member has a cylindrical leg portion, the bottom surface of which is provided with one or more slots therein. The upper surface of the flange portion of the seal carrier abuts against a compression bypass spring mounted concentrically about the upper portion of the piston. The upper end of the bypass spring abuts against a piston stop. A seal protector ring is mounted on the piston body so that the upper face of the protector ring abuts the lower surface of the o-ring and with the o-ring covers the slots in the seal carrier.

During a compressive movement of the piston, hydraulic fluid in the compression chamber below the piston body is pressurized. At low compression speeds and forces the fluid pressure deflects (deforms) the o-ring and fluid passes radially inwardly through the slots in the bottom of the cylindrical leg portion of the carrier into the rebound chamber above of the piston body. As piston speed increases, the fluid pressure overcomes the load on the bypass spring, the o-ring and the seal carrier move upwardly on the piston, away from the protector ring, thus allowing fluid to pass radially inwardly around the entire annular axially extending space between the bottom of the cylindrical leg portion of the seal carrier and the protector ring into the rebound chamber above the piston body.

One problem with this prior art design is that a relatively large oil flow area is exposed with only a slight upward movement (as little as 0.02 inches) of the seal carrier. Once the seal carrier and o-ring separate from the protector ring exposing the large oil flow area, the bypass spring element of fluid control is essentially eliminated. Thus, the bypass spring element of fluid flow control essentially becomes an on/off switch.

Once the bypass spring element of the control is overcome by fluid pressure, fluid flow control is provided by restriction holes of fixed diameter in the piston body. The difficulty with such restriction holes is that fluid flow control is viscosity dependent rather than pressure dependent.

Since viscosity of the fluid decreases as shock temperature increases, hot thinner fluid will have lower resistance to passing through the piston fixed diameter restriction holes than cooler, thicker fluid. The lower resistance at elevated fluid temperatures will result in lowered pressure on the compression chamber side of the piston and the shock will therefore generate less compression ride control force at a given piston speed. This loss of ride control force at elevated fluid temperatures is known as "fade". Such fade may be significant in shock absorbers subject to temperature extremes, such as in snowmobiles, where the initial fluid temperature is at room temperature or below and may increase to 200° F. or more during use.

SUMMARY OF THE INVENTION

One of the principal objects of the present invention is to provide an improved shock absorber which has a piston compression valve assembly that is dependent upon fluid pressure, rather than fluid temperature for ride force control, in order to reduce shock absorber fade at high fluid temperatures. In other words, the piston compression valve assembly of the improved shock absorber is dependent on fluid pressure, for ride force control at all except very low speeds (e.g., less than 10 inches per second), rather than fluid viscosity.

Related objects of the present invention are to provide an improved shock absorber having improved ride force characteristics, in comparison with control of prior shock absorbers, and having a piston compression valve assembly that depends upon deflection of a bypass spring for fluid flow control at all higher piston speeds (e.g., more than 10 inches per second) at all fluid temperatures.

More specifically, the improved shock absorber of the present invention includes a tubular member defining a cylindrical chamber, a piston slidably mounted within the cylindrical chamber, a piston rod extending from one side of the piston outwardly from one end of the tubular member, closure means on said one end of said tubular member closing the one end of said tubular member and slidably sealingly engaging the piston rod, end closure means on the opposite end of said tubular member, hydraulic fluid filling rebound and compression chambers within said cylindrical chamber on the piston rod side of said piston and on the opposite side thereof respectively, said piston having first passage means therethrough, rebound valve means disposed in cooperating relation with said first passage means to control flow of fluid from said rebound chamber to said compression chamber, second passage means disposed between the outer periphery of said piston and the interior periphery of said cylindrical chamber, a compression valve mechanism carried by said piston for controlling the flow of fluid through said second passage means from said compression chamber to said rebound chamber, and means to accommodate the flow of hydraulic fluid resulting from piston rod displacement, and the improvement wherein said piston compression valve mechanism comprises an upwardly facing annular valve seat on said piston, a seal carrier member carried by said piston comprising an upper radially extending flange portion having upper and lower arms, and a lower cylindrical portion concentrically positioned about said piston, said lower arm of said flange portion having an inner downwardly facing surface adapted to engage the upwardly facing annular valve seat, said upper arm of said flange portion having an upwardly facing spring force transmitting surface, and said cylindrical portion having a plurality of flow openings spaced about its circumference and along its length, said flow openings being in a normally closed position but adapted to permit controlled flow of fluid from said second passage means position into said rebound chamber by moving to an open position in response to fluid pressure on said carrier member, an o-ring seal mounted on said carrier member between and in contact with said upper and lower arms, said o-ring having an outer peripheral surface in sealing engagement with the interior surface of said cylindrical chamber to seal the flow of fluid from said second passage means into said rebound chamber; and a spring mounted on said piston above said carrier member and having a lower end disposed in contact with the force transmitting surface of the flange portion, said spring normally biasing said force transmitting surface downwardly after said carrier member has moved a predetermined distance upwardly relatively to the piston from its closed position where the inner lower surface of the lower flange of the said carrier member makes sealing contact with the upward facing annular valve seat on the said piston, thereby one or more of said flow openings may be exposed prior to spring deflection to allow soft low speed ride force control, and said spring thereafter being adapted to deflect upwardly in response to fluid pressure exerted on said seal carrier, causing said seal carrier to slide an additional distance upwardly on said piston, thereby exposing additional flow openings.

These and other objects of the present invention will become more apparent from the following detailed description.

DESCRIPTION OF THE DRAWINGS

The invention may be best understood with reference to the accompanying drawings illustrating the preferred embodiments of the invention, wherein:

FIG. 1. is a cross-sectional view of a shock absorber embodying the principles of the present invention;

FIG. 2 is a bottom plan view of the seal carrier member;

FIG. 3 is a sectional view of the seal carrier member; and

FIG. 4 is a sectional view of the piston of the present invention. In the following Description of the Preferred Embodiment, the terms "upper", "lower", "upwardly", "downwardly" and the like will be used. It should be understood that these terms have reference to the embodiment as shown in the drawings.

DETAILED DESCRIPTION OF THE PREFERRED EMBODIMENTS

Referring now more particularly to FIG. 1 of the drawing, a double-acting hydraulic shock absorber comprises a substantially cylindrical outer casing 10, the upper end of which receives an end closure assembly 12, and the lower end of which receives a cup-shaped closure member 14. It will be understood that the upper end of the shock absorber illustrated is provided with a cylindrical guard or shield (not shown) that is spaced radially outwardly from the outer casing 10, and within which the outer casing 10 moves telescopically with respect to the cylindrical guard. The cylindrical guard includes a cap member that is provided with an eye through which a mounting pin or other mounting device is inserted to connect the shock absorber to the sprung mass of a vehicle. It will also be understood that the closure member 14 is also provided with an eye (not shown) on its outer side for connecting the lower end of the shock absorber with the unsprung mass of the vehicle, as is well known in the art.

A pressure or working cylinder 16 defines a cylindrical chamber within which a piston 20 is slidably mounted. The piston 20 divides the cylindrical chamber into an upper rebound or recoil chamber 22 and a lower compression chamber 24. It will be understood that the rebound and compression chambers are filled with hydraulic fluid. The working cylinder 16 is disposed within the outer casing 10 in spaced concentric relationship therewith so that the space defined by the casing 10, the cylinder 16, the closure assembly 12 and the end closure 14 constitutes a reservoir 18 for the hydraulic fluid in the shock absorber.

The closure assembly 12 serves to slidably sealingly engage the exterior periphery of a piston rod 26, which extends into the rebound chamber 22 and is suitably connected to the piston 20. In this regard, the closure assembly 12 is provided with a groove 28 in which is positioned a rod guide o-ring 29. The o-ring 29 serves to block flow between the piston rod 26 and the closure assembly 12, which advantageously limits recoil stroke fade. The outer end of the piston rod is suitably connected to the eye provided on the cap member for mounting the shock absorber to the sprung mass of the vehicle.

The lower end of the working cylinder 16 is connected to an inverted cup-shaped closure and valve cage member 30, the lower end of which is connected to the closure member 14. The valve cage member 30 mounts a replenishing valve 32 and an impact valve 34. During the impact or downward stroke of the piston of the shock absorber, a quantity of fluid, equivalent to the piston rod volumetric displacement, will flow from the working cylinder 16 through the impact valve 34 when a predetermined oil pressure occurs, and then through passages between the valve cage member 30 and the closure member 14 into the reservoir 18. During the rebound or upward stroke of the piston, the replenishing valve 32 unseats, and fluid flows from the reservoir 18 through the replenishing valve 32 and into the working cylinder 16. The structure and function of the impact valve and replenishing valve are well known to those skilled in the art.

The piston 20 has an elongated lower skirted portion 42 having an outside diameter such as to slidably interfit within the working chamber 16. The piston further includes an upper cylindrical portion 44 of reduced diameter that defines an upwardly facing annular valve seat 45 at the junction of the skirted portion and the cylindrical portion. The upper cylindrical portion terminates at a spacer member 47, which is positioned between the upper cylindrical portion 44 and a piston stop 46. A recoil valve 52 and a recoil valve spring 54 are mounted within the skirted portion 42 in such a way as to permit variable restriction of the fluid flow across the piston 20, as is well known in the art.

As best seen in FIG. 4, the periphery of the lower skirted portion 42 is provided with a plurality of circularly spaced axially extending grooves or passages 48. The grooves 48 provide paths for the passage of hydraulic fluid upwardly between the interior periphery of the working cylinder 16 and the exterior periphery of the piston 20. In order to control the flow of hydraulic fluid from the compression chamber 24 through the grooves 48 to the recoil chamber 22 during the impact stroke, there is provided an improved spring controlled valve and seal mechanism, generally indicated at 60 in FIG. 1, embodying the principles of the present invention.

The valve and seal mechanism 60 includes three main components, namely, an o-ring seal 62, a seal carrier member 64 for the o-ring, and a helical coil spring 66.

The seal carrier 64 includes a lower cylindrical portion 72 concentrically positioned on the skirted portion 42 of the piston, and an upper radially extending flange portion 74. The flange portion 74 has a lower radially extending arm 75 and an upper radially extending arm 76 and a u-shaped cross section. The inner lower surface of the lower radially extending arm 75 is adapted to engage the annular valve seat 45 of the piston. The upper arm 76 has an upwardly facing spring force transmitting surface 77.

The lower cylindrical portion 72 has an outer surface 73 spaced radially inwardly from the interior surface 17 of the working cylinder 16. The outer surface 73 and the interior surface 17 define an annular axially extending space 78 that communicates with the grooves 48 on the piston. In order to accommodate the width of the cylindrical portion 72 on the piston 20 and form the annular space 78, the skirted portion 42 of the piston has a bearing surface portion 50 of reduced diameter.

As best seen in FIGS. 2 and 3, the seal carrier 64 is provided with a series of flow openings 80 spaced about the circumference of the cylindrical portion 72 and located at different positions along its axial length. The number, size, and arrangement of the openings may vary depending on the operating characteristics desired for the shock absorber. In one model shock absorber, it has been found, fluid flow control throughout the range of speeds and temperatures may be suitably maintained with thirteen openings 80 of approximately 0.04 inches in diameter, and spaced approximately equidistantly about the circumference of the cylindrical portion 72 at axial positions about 0.03 inches apart. More specifically, the openings 80 are axially arranged in spiral stairstep fashion about the cylindrical portion 72, with one opening 80a located at the bottom-most level of approximately 0.160 inches from the bottom of the cylindrical portion, the next two openings 80b and 80c located at the 0.190 inch level, the next two openings 80d and 80e positioned at the 0.220 inch level, the next three openings 80f, 80g and 80h positioned at the 0.250 inch level, with the remaining openings 80i, 80j, 80k, 80l and 80m positioned at the 0.280, 0.310, 0.340, 0.370 and 0.400 inch levels, respectively. The openings 80 are typically formed by drilling. In another, more preferred embodiment, seven openings 80 are utilized, with one opening at the 0.270 inch level; one opening at the 0.300 inch level; one opening at the 0.360 inch level; one opening at the 0.390 inch level; and three openings at the 0.420 inch level. These seven openings are equispaced about the longitudinal axis of the carrier 64 at about 51° intervals. The diameter of each of the seven openings is 0.052 inches, +0.002 inches, −0.001 inches.

As best understood from FIG. 1, the openings 80 are normally closed by the bearing surface 50 on the piston skirt 42 so that flow of fluid from the grooves 48 and the annular space 78 into the rebound chamber 22 is prevented.

The o-ring 62 is mounted on the seal carrier 64 between and in contact with the upper and lower arms of the flange portion 74 so that the outer periphery of the o-ring contacts the inside surface 17 of the working cylinder 16 to seal the flow of hydraulic fluid from the grooves 48 and the annular space 78 into the rebound chamber 22. The o-ring is normally circular in cross-section and is formed of any suitable elastomeric material.

The coil spring 66 surrounds the upper cylindrical portion 44 of the piston and is normally positioned so that its lower end sits or rests on the spring force transmitting surface 77, and its upper end is positioned adjacent to, but not in contact with, with the piston stop 46. Preferably, there is a gap of approximately 0.06 inches between the piston stop 46 and the upper end of the coil spring 66, to permit soft valving in the compression stroke at low piston speeds. The coil spring 66 is of relatively long deflection and high rate in order to maintain spring modulation and prevent reversion to a viscosity sensitive control.

Prior to a compression stroke, the coil spring 66 does not function to urge the inner portion of the lower surface of the lower arm 75 of the seal carrier into engagement with the annular valve seat 45 of the piston. During a recoil or extension stroke, fluid pressure in the recoil chamber 22 against the upper surface of the seal 62 holds the seal carrier 64's inner lower surface of the lower arm 75 in sealing contact with the piston 20's annular valve seat 45. During a compression or impact stroke, the fluid pressure in the compression chamber builds and fluid is forced through the grooves 48 and into the annular space 78. When the fluid pressure builds against the outer portion of the lower surface of the lower arm 75, the o-ring 62 and the seal carrier 64 slide upwardly on the piston a short distance, 0.06 inches as noted above, until the spring 66 begins exerting a bias against the surface 77 and resisting further upward movement of the o-ring 62 and carrier 64. As the seal carrier moves upwardly, the flow openings 80 are gradually exposed (before and after the spring 66 begins to exert a downward bias on seal carrier 64) to the space above the bearing surface 50 of the skirted portion 42, thus allowing hydraulic fluid to move from the compression chamber 24 through the piston grooves 48, the annular space 78, and the exposed openings 80 into the rebound chamber 22 above the piston 20. As the piston speed increases, the hydraulic fluid pushes against the outer portion of the lower surface of lower arm 75 of the carrier 64 with increased force, causing increased deflection in the spring 66, which causes the carrier to slide upwardly even further, thereby exposing more of the openings 80. Preferably, the seal carrier has a maximum travel distance of 0.3 inches, at which all of the openings 80 will be exposed. As the operating temperature of the shock absorber increases, the hydraulic fluid temperature also increases and the viscosity decreases. At a given piston speed the hotter, thinner hydraulic fluid will result in reduced upward deflection of the carrier 64 (and thereby spring 66) than the cooler, thicker fluid. The hotter, thinner fluid at the given piston speed generates less pressure in the annular space 78 when passing through the openings 80 than colder, thicker fluid. The reduced pressure in annular space 78 results in reduced force on outer lower flange arm 75 and thereby spring 66. This reduced force results in reduced upward deflection of seal carrier 64 (and spring 66) which results in fewer openings 80 being exposed. This reduction of openings 80 exposed will restrict fluid flow from compression chamber 24 to recoil chamber 22 through piston grooves 48 and annular space 78. This restricting of fluid flow by the spring 66 reducing the exposure of flow openings 80 offsets the pressure loss that would occur in annular space 78, piston grooves 48 and compression chamber 24 due to fluid viscosity loss if the flow opening remained constant (pressure is proportional to flow restriction). The flow area through openings 80 must be reduced when fluid viscosity is decreased due to temperature increase (e.g. 70° to 230° F.) in order to minimize the loss of pressure in the compression chamber opposing piston movement (or minimize compression fade) at a given piston compression speed (e.g. 10 to 80 inches per second). Thus it may be seen that control of fade is dependent on the number of openings 80 exposed being directly proportionate to the pressure of hydraulic fluid on the outer portion of the lower surface of the lower arm 75 of the seal carrier 64 which is directly modulated by spring 66 at most piston speeds (e.g. 10 to 80 inches per second).

It is estimated that the pressure dependent piston compression valve design of the present invention reduces the amount of fade at high-temperatures to 10% or less, whereas prior art shock absorbers exhibit fade of 25% or more for the same piston speeds (e.g. 10 to 80 inches per second) and fluid temperatures (e.g. increasing from 70° to 30° F.). The improved shock absorber of the present invention also allows for soft ride force characteristics at low piston speeds (of less than approximately 10 inches per second) using the distance (0.06 inches, in the preferred embodiment) between the upper end of the bypass spring 66 and the piston stop 46 for movement of the carrier 64 unopposed by the bypass spring 66. At the same time, the use of spring modulation of seal carrier 64 by spring 66 at higher piston speeds seen in snowmobile applications (e.g., from 10 inches per second to 80 inches per second) allows selection of relatively stiff ride force characteristics at mid range speeds (e.g., 25 to 40 inches per second) while keeping the ride force characteristics at high piston speeds (e.g., 60 to 80 inches per second) relatively soft. This gradually increasing relationship between ride force characteristics and piston speeds is not believed to be possible with the prior art shock absorbers with their use of a limited bypass spring element of flow control and a restriction hole of fixed size to control ride force characteristics at all piston speeds above the bypass spring element of control. The fixed size restriction hole(s) results in an exponential relationship between ride force characteristics and piston speed. The existing shock absorbers therefore require that trade-offs be made between the ride force characteristics at mid-range and high piston speeds as the two piston speed ranges cannot be separately addressed as is done with the improved shock absorber.

The preferred embodiments of the invention disclosed herein are illustrative of the invention, and it will be understood that the invention is not limited thereto since modifications may be made by those skilled in the art. It is therefore contemplated by the appended claims to cover any such modification which incorporates those features which come within the true spirit and scope of the invention.

What is claimed is:

1. In a shock absorbing device for a vehicle which includes a tubular member defining a cylindrical chamber, a piston slidably mounted within the cylindrical chamber, a piston rod extending from one side of the piston outwardly from one end of the tubular member, closure means on said one end of said tubular member closing the one end of said tubular member and slidably sealingly engaging the piston rod, end closure means on the opposite end of said tubular member, hydraulic fluid filling rebound and compression chambers within said cylindrical chamber on the piston rod side of said piston and on the opposite side thereof respectively, said piston having first passage means therethrough, rebound valve means disposed in cooperating relation with said first passage means to control flow of fluid from said rebound chamber to said compression chamber, second passage means disposed between the outer periphery of said piston and the interior periphery of said cylindrical chamber, a compression valve mechanism carried by said piston for controlling the flow of fluid through said second passage means from said compression chamber to said rebound chamber, and means to accommodate the flow of hydraulic fluid resulting from piston displacement, the improvement wherein said piston compression valve mechanism comprises:

an upwardly facing annular valve seat on said piston;

a seal carrier member carried by said piston comprising an upper radially extending flange portion having upper and lower arms, and a lower cylindrical portion concentrically positioned about said piston, said lower arm of said flange portion having an inner downwardly facing surface adapted to engage the upwardly facing annular valve seat, said upper arm of said flange portion having an upwardly facing spring force transmitting surface, and said cylindrical portion having a plurality of flow openings spaced about its circumference and along its length, said flow openings being in a normally closed position but adapted to permit controlled flow of fluid from said second passage means into said rebound chamber by moving to an open position in response to fluid pressure on said seal carrier member;

an annular seal mounted on said carrier member between and in contact with said upper and lower arms, said seal having an outer peripheral surface in sealing engagement with the interior surface of said cylindrical chamber to seal the flow of fluid from said second passage means into said rebound chamber; and a spring mounted on said piston above said carrier member and having a lower end disposed in direct contact with the force transmitting surface of the flange portion, and said spring being adapted to deflect upwardly in response to fluid pressure exerted on said seal carrier member, causing said seal carrier member to slide on said piston, thereby exposing at least one of said flow openings.

2. The improvement of claim 1 wherein said lower cylindrical portion has an outer surface spaced radially inwardly from the interior surface of said cylindrical chamber to form an annular space in communication with said second passage means.

3. The improvement of claim 1 wherein said seal carrier member has a maximum travel distance of about 0.3 inches.

4. The improvement of claim 1 wherein said piston includes an annular piston stop positioned above said spring, and said spring has an upper end positioned a distance from said annular piston stop.

5. The improvement of claim 4 wherein the distance between the upper end of said spring and said piston stop is 0.06 inches.

* * * * *